J. H. SHAW.
SCALE BEAM.
APPLICATION FILED DEC. 12, 1913.
1,167,941. Patented Jan. 11, 1916.
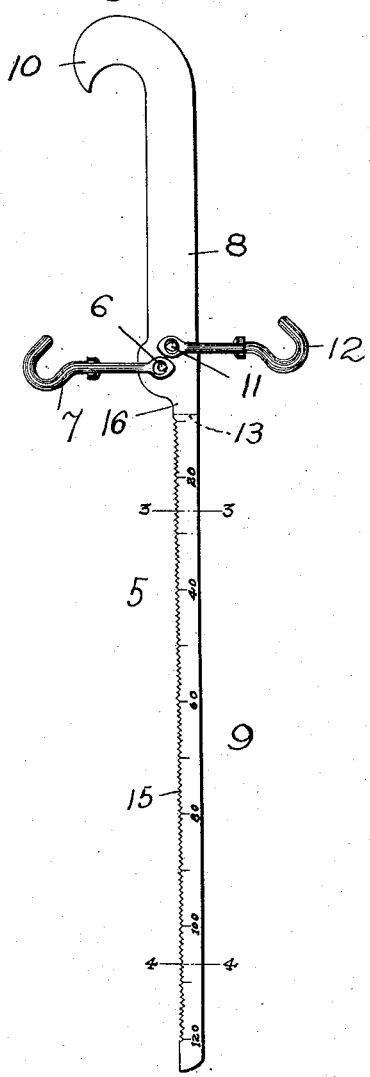
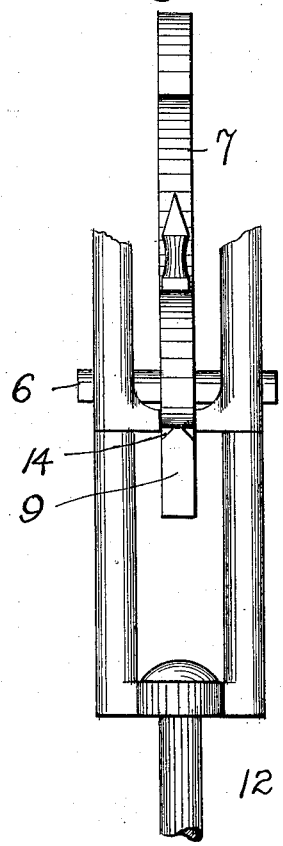
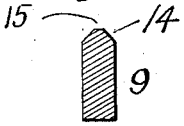
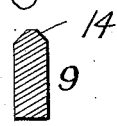

UNITED STATES PATENT OFFICE.

JOHN H. SHAW, OF NEW HAVEN, CONNECTICUT, ASSIGNOR TO SARGENT & COMPANY, OF NEW HAVEN, CONNECTICUT, A CORPORATION OF CONNECTICUT.

SCALE-BEAM.

1,167,941.  Specification of Letters Patent.  Patented Jan. 11, 1916.

Application filed December 12, 1913. Serial No. 806,249.

*To all whom it may concern:*

Be it known that I, JOHN H. SHAW, a citizen of the United States, residing in the city and county of New Haven and State of Connecticut, have invented certain new and useful Improvements in Scale-Beams, of which the following is a full, clear, and exact description.

This invention relates to scale beams of the class in which the beam proper is suspended at its center of gravity from a suitable support, by means of a hook or the like, the portion of the beam at one side of the point of suspension being adapted to suspend the article to be weighed, and that portion of the beam at the other side of the point of suspension being graduated, and adapted to coöperate with one or more poises.

In scale beams as heretofore manufactured, the body or beam proper has generally been fashioned from a single metal blank. The article-suspending portion is usually of greater cross section than the graduated or poise-supporting portion, for the purpose of minimizing the total length of the beam. Moreover, the article-suspending portion is of different shape than the poise-supporting portion.

Heretofore it has been common practice to forge the beam as a unit from a single metal plate or blank. This method of manufacture, however, is open to the following objections. First, the manufacture of the article is difficult and entails considerable expense and loss of time, more particularly for the reason that the forging of the graduated or poise-supporting portion of the beam in a shape which is even approximately straight, smooth and symmetrical requires a high degree of skill not possessed by the average mechanic. Even when the operator is highly skilled, the results are not satisfactory from the standpoint of manufacturing method, so great is the difficulty incident to the forging of the graduated poise-supporting part of the beam, by means of the forging hammers or presses commonly available. Second, the results are unsatisfactory as regards the article itself, because the latter is a measuring instrument which, in order to be accurate, has to be accurately fashioned. When the beam is forged in the manner described, the graduated portion thereof is extremely ununiform in cross section. The area of cross section, taken at points close together, varies considerably, and likewise the shape of the cross section. As a result, the calibration of the graduations on the scale is a very difficult matter. In order to obtain accurate results, each of the major graduations has to be determined by test for each beam. In order to produce an absolutely accurate instrument, the amount of work, and the amount of time, involved in the calibration of the scale would be enormous, and the approximate results which it is possible to obtain by ordinary methods of manufacture are so unsatisfactory, that the beam cannot, or should not, be used where, in weighing articles, anything more than a close approximation of the weight is desired.

The primary object of my invention is to overcome the above mentioned drawbacks, both with respect to the scale beam itself, and the method of making the same. By my improvements, the problem of constructing an accurate scale beam is very much simplified. Moreover, my improved scale beam can be made by the average mechanic in such a manner as to give extremely accurate results.

More particularly, my improvements reside in the elimination of the forged graduated portion of the beam, and the substitution therefor of a graduated portion which is accurately uniform in cross sectional shape and area throughout its length. This renders the calibration of the scale a comparatively easy matter. The testing out of each of the major graduations is unnecessary, and the graduation marks can, in fact, be applied to the beam in an accurate manner by means of a roller, such as commonly employed in marking carpenters' squares.

To these and other ends, the invention consists in the novel features and combinations of parts to be hereinafter described and claimed.

In the accompanying drawing, Figure 1 is a side elevation of a scale beam embodying my improvements (for convenience of illustration, the beam is disposed vertically instead of horizontally); Fig. 2 is an enlarged end view of the same; Fig. 3 is an enlarged section on line 3—3 of Fig. 1; and Fig. 4 is an enlarged section on line 4—4 of Fig. 1.

Referring to the drawing, 5 indicates the beam proper, which is provided intermediate of its ends with a pivot 6, located at the center of gravity, and from which the beam is suspended by means of a hook 7, adapted to engage a suitable support. The article-suspending-portion of the beam is indicated at 8, and the graduated poise-supporting portion is indicated at 9. The portion or plate 8 is of greater cross section than the portion 9, for the purpose of minimizing the length of the beam, and it is furthermore provided for the same purpose with a reversely turned part or hook 10, at the extremity of the beam. Closely adjacent the main pivot 6, the article-suspending portion 8 is provided with a pivot 11, from which a hook 12 is suspended, and it is from this hook 12 that the article to be weighed is supported or suspended. One or more suitable poises of well-known form (not shown) are used in connection with the graduated portion 9 of the beam in the customary manner.

The graduated portion 9 is of uniform profile or cross section throughout its length. In order to produce this result, I take an accurately rolled bar and join it by welding to the article-suspending portion 8 of the beam. The weld or junction of the parts 8 and 9 is indicated by the dotted line 13 in Fig. 1. In a bar, rolled with ordinary skill, the cross section can be made quite uniform, and the bar in order to serve as a part of the scale beam does not need to undergo any mechanical operations which would warp it or alter its cross section or generally uniform molecular structure, either before or after it is joined to the other part of the scale by welding. The milling of the upper edge of the part 9, in tapered form as shown at 14 in Figs. 3 and 4, will not alter the uniformity of said part, nor will such uniformity be affected by the customary serration or notching of the upper edge of the part 9, as indicated at 15. As for the welding together of the parts 8 and 9, this can be readily carried out in such a manner as not to alter the cross section of the part 9 substantially throughout its length, and particularly where, as in the case illustrated, the junction or weld 13 is located slightly beyond the point where the graduations begin, as shown in Fig. 1.

It will be noted that in the form shown, the suspending pivot 6 of the scale is located in the part of greater cross section, and that the weld 13 is located oppositely in reference to the pivot 11 with respect to the pivot 6. In other words, the pivot 6 is between the pivot 11 and the weld. For the purpose of facilitating the welding operation, the portion of larger cross section is provided with a stub 16 substantially equal in cross section to the part 9, so that the parts to be joined by the weld will be of equal size. In this manner, a neat, homogeneous joint can be readily made.

By my improvements, the manufacture of the scale beam is considerably simplified as the troublesome forging operation is not necessitated. The integral connection of the two parts of the beam by welding can be effected without difficulty by a person of ordinary skill, having at his disposal an appropriate welding apparatus. The milling and notching operations are also matters of no particular difficulty. The portion of larger cross section to which the rolled bar is welded can be readily cut out of a metal plate and shaped up, the operation being much simpler than when the blank for the whole beam is cut as a unit, as heretofore. The welding of the uniformly profiled bar to the other part of the scale not only simplifies the manufacture, but, moreover, it simplifies very considerably the calibration of the instrument.

It will be readily understood that as the cross section area of the graduated portion is uniform throughout the length of the latter, the graduations will be spaced uniformly from each other. Hence, when, by test, the location of one graduation has been determined, the other graduations may be very readily applied. If desired, the graduations may be rolled into the beam by a roller, such as commonly used in graduating carpenters' squares. Moreover, when the scale beams are made in quantities, manufacture can be so standardized as to facilitate calibration to a remarkable extent.

The troublesome and inaccurate method of testing out a plurality of graduations on each square will no longer be necessary, and the manufacturer can place on the market, at a comparatively low cost, a simple scale beam of uncommon accuracy.

It will be understood therefore that by my invention I provide a scale beam in which the plate or relatively wide portion 8 is flat and provided at one end with a solid stub which is narrower than said plate, but of substantially the same thickness, the bar 9 being of approximately the same cross-section as said stub, and being joined thereto by a butt weld so that the side faces of the bar are substantially flush with the side faces of the plate. By this construction, the device can be made very accurately, and at the same time the construction is simple, neat and inexpensive.

What I claim is:

A scale beam, comprising a relatively wide flat plate having at one end a solid stub projecting integrally therefrom, said stub narrower than said plate but of substantially the same thickness, a bar of approximately the same cross-section as said stub abutting against the end of the latter and welded thereto by a substantially invisible weld, said bar being of substantially uniform cross-section throughout its length, and provided with a plurality of graduations, a suspension pivot for the beam projecting laterally from one face of said plate, and a suspension pivot for the article to be weighed, projecting laterally from one face of said plate; substantially as described.

In witness whereof, I have hereunto set my hand on the 10th day of December, 1913.

JOHN H. SHAW.

Witnesses:
FRANK T. KIRSCHNER,
BERTHA RAY.